(12) United States Patent
Katayama et al.

(10) Patent No.: US 7,718,271 B2
(45) Date of Patent: May 18, 2010

(54) MATERIAL FOR LASER WELDING AND LASER WELDING METHOD

(75) Inventors: Tsutomu Katayama, Ube (JP); Yasuharu Fukui, Ube (JP); Shigenari Takeda, Ube (JP)

(73) Assignee: Ube Industries, Ltd. (JP)

( * ) Notice: Subject to any disclaimer, the term of this patent is extended or adjusted under 35 U.S.C. 154(b) by 972 days.

(21) Appl. No.: 10/573,904

(22) PCT Filed: Sep. 30, 2004

(86) PCT No.: PCT/JP2004/014793
§ 371 (c)(1), (2), (4) Date: Mar. 29, 2006

(87) PCT Pub. No.: WO2005/032801
PCT Pub. Date: Apr. 14, 2005

(65) Prior Publication Data
US 2007/0134504 A1 Jun. 14, 2007

(30) Foreign Application Priority Data
Oct. 2, 2003 (JP) ............................. 2003-344188

(51) Int. Cl.
*B29C 65/16* (2006.01)
*B29C 65/40* (2006.01)
*F21V 17/00* (2006.01)
*C09J 201/00* (2006.01)
*C09J 177/00* (2006.01)
*B23K 15/00* (2006.01)

(52) U.S. Cl. .............. 428/474.7; 428/474.4; 428/475.5; 219/121.13; 219/121.64; 220/DIG. 29

(58) Field of Classification Search .............. 428/474.7, 428/474.4, 475.5; 219/121.13, 121.64; 220/DIG. 29
See application file for complete search history.

(56) References Cited
FOREIGN PATENT DOCUMENTS

| JP | 60-214931 A | 10/1985 |
|---|---|---|
| JP | 5-42336 A | 2/1993 |
| JP | 5-42336 B2 | 6/1993 |
| JP | 10-180876 A | 7/1998 |
| JP | 2000-238218 A | 9/2000 |
| JP | 2002-18961 A | 1/2002 |
| JP | 2002-283457 A | 10/2002 |

*Primary Examiner*—Ana L Woodward
(74) *Attorney, Agent, or Firm*—DLA Piper LLP (US)

(57) ABSTRACT

A laser welding material and laser welding method which can satisfactorily weld resin members of different resin materials that have no or little adhesive property is provided and includes a set of resin materials constituting a first resin member, a second resin member and a third resin member in which the first resin member and the second resin member are different materials and the first resin member does not absorb laser light and which is used for laser-welding the three members by overlapping the third resin member with the first and second resin members and irradiating laser light to the three members from the first resin member side, and a layer welding method.

18 Claims, 1 Drawing Sheet

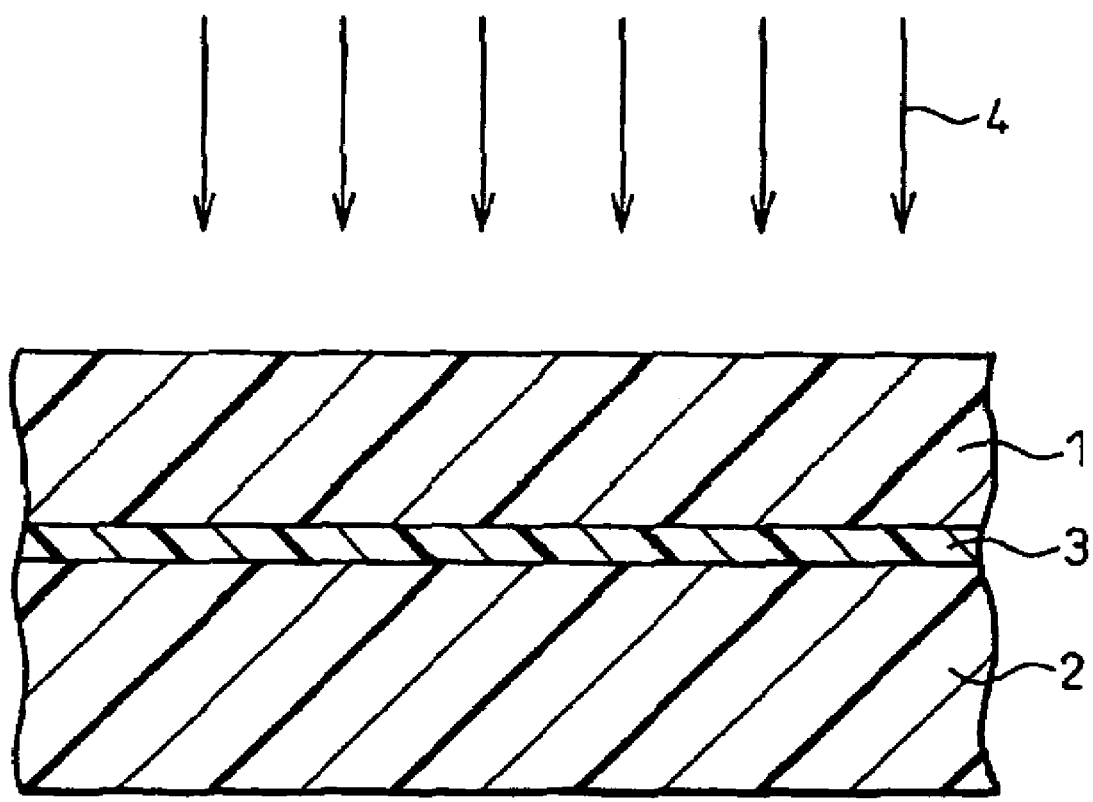

MATERIAL FOR LASER WELDING AND LASER WELDING METHOD

RELATED APPLICATION

This is a §371 of International Application No. PCT/JP2004/014793, with an international filing date of Sep. 30, 2004 (WO 2005/032801 A1, published Apr. 14, 2005), which is based on Japanese Patent Application No. 2003-344188, filed Oct. 2, 2003.

TECHNICAL FIELD

The present invention relates to materials for laser welding and a to laser welding method. The materials are resin members able to be welded by irradiated laser light.

BACKGROUND

As methods for joining resin members with each other, a method using an adhesive and a welding method such as hot plate welding, vibration welding, ultrasonic welding and spin welding, have been conventionally known. In recent years, an injection welding method such as DRI and DSI, and a laser welding method have also become available.

The joining method using an adhesive is a manual operation by a worker and this is an inefficient operation. Furthermore, this method is disadvantageous in that stable joining strength cannot be obtained and, depending on the kind of the resin member, a sufficiently high adhesive force may not be obtained. Also, environmental contamination is a problem with this method.

Hot plate welding has problems that the cycle is long, a filling material is necessary, or welding cannot be effected in the water-absorbed state. Vibration welding is disadvantageous in that, for example, the welding part shifts 1 to 2 mm due to the vibration, giving rise to unsuitability for precision components, a flash is generated to cause clogging of a filter or the like, or welding can be hardly effected when a warp exists. Ultrasonic welding has the drawbacks that, for example, the weld strength is low, the airtightness is poor, or the welding is applicable only to small members. Spin welding is applicable only to circular members and has the problems that a filling material is necessary or welding cannot be effected in the water-absorbed state.

Also, DRI and DSI, which are injection welding methods recently employed for intake manifolds, have a problem that despite high weld strength, for example, the die is expensive, the molding machine needs to be modified, and these welding methods cannot be used unless the material has particularly good flowability.

On the other hand, the laser welding is a method of welding a resin member non-absorptive of laser light and a resin member absorptive of laser light by abutting these members against each other, where laser light is irradiated on the joining face from the non-absorptive resin member side, and the absorptive resin member forming the joining face is melted by the energy of laser light, thereby effecting joining (see, for example, Japanese Unexamined Patent Publication (Kokai) No. 60-214931 and Japanese Examined Patent Publication (Kokoku) No. 5-42336).

However, there is a problem that a sufficiently high joining strength cannot be obtained in joining resin members which are dissimilar and, particularly, are resin members which are dissimilar materials having no or little adhesive property, for example, members such as nylon 6 and nylon 12.

SUMMARY

In order to attain the above-described object, the present inventors have made intensive studies on the joining method using laser light, where first and second resin members having no or little adhesive property can be firmly joined and, as a result, it has been found that when a third resin member comprising a polymer having at least one constitutional unit the same as or analogous to the constitutional unit of the first resin and at least one constitutional unit the same as or analogous to the constitutional unit of the second resin is overlapped with the first resin member and the second resin member, and the second resin member and/or the third resin member is designed to have absorptivity of laser light, the first and second two members can be satisfactorily joined.

According to selected aspects of the present invention, the following are provided.

[1] A set of laser weldable materials constituting a first resin member, a second resin member and a third resin member, respectively, in which the first resin member and the second resin member are different materials, the first resin member is non-absorptive of laser light and the second resin member is absorptive of laser light and which is used for laser-welding the three members by overlapping the third resin member with the first resin member and the second resin member and irradiating laser light to the three resin members from the first resin member side, wherein the material constituting the first resin member comprises a first resin non-absorptive of laser light, the material constituting the second resin member comprises a second resin and an additive absorptive of laser light, and the material constituting the third resin comprises a polymer having at least one constitutional unit the same as or analogous to the constitutional unit of the first resin and at least one constitutional unit the same as or analogous to the constitutional unit of the second resin.

[2] A set of laser weldable materials constituting a first resin member, a second resin member and a third resin member in which the first resin member and the second resin member are different materials and the first resin member is non-absorptive of laser light and is used for laser-welding the three members by overlapping the third resin member with the first resin member and the second resin member and irradiating laser light to the three resin members from the first resin member side, wherein the material constituting the first resin member comprises a first resin non-absorptive of laser light, the material constituting the second resin member comprises a second resin, the material constituting the third resin member comprises a third resin and an additive absorptive of laser light, and the third resin comprises a polymer having at least one constitutional unit the same as or analogous to the constitutional unit of the first resin and at least one constitutional unit the same as or analogous to the constitutional unit of the second resin.

[3] The set of laser weldable materials as described in [1] or [2] above, wherein the first resin, the second resin and the third resin are each a polyamide.

[4] The set of laser weldable materials as described in [1] or [2] above, wherein the combination of the first resin and the second resin is a combination of polyamide 6 and polyamide 12.

[5] The set of laser weldable materials as described in [1] or [2] above, wherein the material constituting the first resin member further comprises an additive weakly absorptive of laser light.

[6] The set of laser weldable materials as described in [1] or [2] above, wherein the third resin is a polyamide 6/12 copolymer nylon.

[7] The set of laser weldable materials as described in [6] above, wherein the weight ratio of the polyamide 6 component and the polyamide 12 component in the polyamide 6/12 copolymer nylon is from 20/80 to 80/20.

[8] The set of laser weldable materials as described in [1] or [2] above, wherein the material constituting the third resin member has a film shape.

[9] The set of laser weldable materials as described in [8] above, wherein the film thickness is from 1 to 1,000 μm.

[10] A laser welding method using the set of laser weldable materials described in [1] to [9] above.

[11] A laser welding method comprising overlapping a third resin member with a first resin member and a second resin member, which are different materials and in which the first resin member is non-absorptive of laser light and the second resin member is absorptive of laser light, and irradiating laser light from the first resin member side to laser-weld the three members, wherein the third resin member comprises a third resin and an additive absorptive of laser light, and the third resin comprises a polymer having at least one constitutional unit the same as or analogous to the constitutional unit of the first resin and at least one constitutional unit the same as or analogous to the constitutional unit of the second resin.

[12] A laser welding method comprising overlapping a third resin member with a first resin member and a second resin member, which are different materials and in which the first resin member is non-absorptive of laser light, and irradiating laser light from the first resin member side to laser-weld the three members, wherein the third resin member comprises a third resin and an additive absorptive of laser light, and the third resin comprises a polymer having at least one constitutional unit the same as or analogous to the constitutional unit of the first resin and at least one constitutional unit the same as or analogous to the constitutional unit of the second resin.

[13] The laser welding method as described in [11] or [12] above, wherein the first resin, the second resin and the third resin are each a polyamide.

[14] The laser welding method as described in [11] or [12] above, wherein the combination of the first resin and the second resin is a combination of polyamide 6 and polyamide 12.

[15] The laser welding method as described in [11] or [12] above, wherein the first resin member further comprises an additive weakly absorptive of laser light.

[16] The laser welding method as described in [11] or [12] above, wherein the third resin is a polyamide 6/12 copolymer nylon.

[17] The laser welding method as described in [16] above, wherein the weight ratio of the polyamide 6 component and the polyamide 12 component in the polyamide 6/12 copolymer nylon is from 20/80 to 80/20.

[18] The laser welding method as described in [11] or [12] above, wherein the third resin member is a film.

[19] The laser welding method as described in [18] above, wherein the film thickness is from 1 to 1,000 μm.

BRIEF DESCRIPTION OF THE DRAWINGS

FIG. 1 is a view for explaining the laser welding method of the present invention.

DETAILED DESCRIPTION

The materials for laser welding of the present invention comprise first and second resin members having no or little adhesive property, and a third resin member having compatibility with these two resin members.

The first resin member (accordingly, the material constituting the first resin member; hereinafter, the term simply referred to as a "first resin member" should be understood to include a "material constituting the first resin member") comprises a resin having no or little adhesive property to the second resin member.

As for the first resin forming the first resin member, any kind of resin may be used as long as it is a resin not exhibiting substantial absorptivity for laser light. Examples thereof include a polyamide, a polypropylene and a styrene-acrylonitrile copolymer. If desired, a reinforcing fiber such as glass fiber or carbon fiber may be added to the resin used.

The term "substantial absorptivity" as used herein means absorptivity such that the portion which has received laser light absorbs laser light and melts. Accordingly, the term "not exhibiting substantial absorptivity" means absorptivity such that, for example, even if slight absorption of laser light occurs, the portion transmits the majority of laser light and the resin in that portion is not melted.

Examples of the polyamide used as the first resin include those comprising a diamine and a dibasic acid, comprising a lactam or an aminocarboxylic acid, or comprising a copolymer of two or more thereof.

Examples of the diamine include an aliphatic diamine such as tetramethylenediamine, hexamethylenediamine, octamethylenediamine, nonamethylenediamine, undecamethylenediamine and dodecamethylenediamine, and a diamine having an aromatic-cyclic structure, such as meta-xylylenediamine.

Examples of the dicarboxylic acid include an aliphatic diamine such as adipic acid, heptanedicarboxylic acid, octanedicarboxylic acid, nonanedicarboxylic acid, undecanedicarboxylic acid and dodecanedicarboxylic acid, and a dicarboxylic acid having an aromatic•cyclic structure, such as terephthalic acid and isophthalic acid.

The lactam is lactams having a carbon number of 6 to 12, and the aminocarboxylic acid is an aminocarboxylic acid having a carbon number of 6 to 12. Examples thereof include 6-aminocaproic acid, 7-aminoheptanoic acid, 11-aminoundecanoic acid, 12-aminododecanoic acid, α-pyrrolidone, ε-caprolactam, ω-laurolactam and ε-enantolactam.

The first resin member preferably further comprises an additive weakly absorptive of laser light.

The additive weakly absorptive of laser light contained in the first resin member may be sufficient if it is a material of partially absorbing laser light and partially transmitting laser light by resonating at the wavelength of laser light. In particular, a material having a transmittance of 40 to 90% for laser light is preferred. This transmittance for laser light is a numerical value obtained when the weakly absorptive additive is shaped into an ASTM No. 1 dumbbell and measured.

The content of the weakly absorptive additive is preferably from 0.1 to 5 wt % based on the first resin member. If the content is less than 0.1 wt %, heat resulting from absorbing the energy of laser light is hardly generated and fails in satisfactorily elevating the temperature of the first resin member and the joining strength in the junction part decreases, whereas if the content exceeds 5 wt %, this is disadvantageous in that the physical properties such as bending modulus decrease or a larger amount of laser light energy is necessary for obtaining a sufficiently high weld strength.

Examples of the weakly absorptive additive include a copolymer of ethylene and other olefins or a vinyl-based compound (hereinafter, this copolymer is referred to as an "ethylene-based copolymer"), a block copolymer obtained by hydrogenating a copolymer of styrene and a conjugated diene compound (hereinafter, this copolymer is referred to as a "styrene-based copolymer"), and a modified ethylene-based copolymer or modified styrene-based copolymer obtained by adding an $\alpha,\beta$-unsaturated carboxylic acid or a derivative thereof to such an ethylene-based copolymer or styrene-based copolymer.

Examples of the ethylene-based copolymer include an ethylene•$\alpha$-olefin-based copolymer, an ethylene•$\alpha,\beta$-unsaturated carboxylic acid copolymer, an ethylene•$\alpha,\beta$-unsaturated carboxylic acid ester-based copolymer, and an ionomer.

The ethylene•$\alpha$-olefin-based copolymer is a polymer obtained by copolymerizing ethylene and an $\alpha$-olefin having a carbon number of 3 or more, and examples of the $\alpha$-olefin having a carbon number of 3 or more include propylene, butene-1, hexene-1, decene-1, 4-methylbutene-1 and 4-methylpentene-1.

The ethylene•$\alpha,\beta$-unsaturated carboxylic acid-based copolymer is a polymer obtained by copolymerizing ethylene and an $\alpha,\beta$-unsaturated carboxylic acid monomer, and examples of the $\alpha,\beta$-unsaturated carboxylic acid monomer include an acrylic acid, a methacrylic acid, an ethacrylic acid and a maleic anhydride.

The ethylene•$\alpha,\beta$-unsaturated carboxylic acid ester-based copolymer is a polymer obtained by copolymerizing ethylene and an $\alpha,\beta$-unsaturated carboxylic acid ester monomer, and examples of the $\alpha,\beta$-unsaturated carboxylic acid ester monomer include an acrylic acid ester such as methyl acrylate, ethyl acrylate, propyl acrylate and butyl acrylate, and a methacrylic acid ester such as methyl methacrylate, ethyl methacrylate, propyl methacrylate and butyl methacrylate.

The ionomer is a copolymer of an olefin and an $\alpha,\beta$-unsaturated carboxylic acid, where at least a part of the carboxyl group is ionized by the neutralization of a metal ion. The olefin is preferably ethylene, and the $\alpha,\beta$-unsaturated carboxylic acid is preferably an acrylic acid, a methacrylic acid or the like. Examples of the metal ion include an ion of such as sodium, potassium, magnesium, calcium and zinc.

The styrene-based copolymer is a block copolymer obtained by hydrogenating a block copolymer consisting of at least one, preferably two or more, polymer block A mainly comprising styrene, and at least one polymer block B mainly comprising a conjugated diene compound, and this copolymer has a structure such as A-B-A, B-A-B-A, A-B-A-B-A or B-A-B-A-B.

Examples of the conjugated diene compound include butadiene, isoprene, 1,3-pentadiene and 2,3-dimethyl-1,3-butadiene.

Examples of the styrene-based copolymer include a hydrogenated styrene-butadiene-styrene copolymer (SEBS) and a hydrogenated styrene-isoprene-styrene copolymer (SEPS).

The modified ethylene-based copolymer and the modified styrene-based copolymer can be obtained by adding a compound containing an $\alpha,\beta$-unsaturated carboxylic acid group or its derivative group, which is in the solution state or melted state, to the ethylene-based copolymer or styrene-based copolymer specified above. Examples of the method for producing these modified ethylene-based copolymer and modified styrene-based copolymer include a method of reacting a compound containing a carboxylic acid group or its derivative group with an ethylene-based copolymer or styrene-based copolymer in the presence of a radical initiator in an extruder.

Examples of the $\alpha,\beta$-unsaturated carboxylic acid or a derivative thereof (hereinafter simply referred to as an "unsaturated carboxylic acid") include an acrylic acid, a methacrylic acid, an ethacrylic acid, a malic acid, a fumaric acid and an anhydride or ester of these acids.

In the first resin, a colorant non-absorptive of laser light may be added. Examples of the colorant include an organic dye such as anthraquinone-based dye, perylene-based dye, perynone-based dye, heterocyclic dye, disazo-based dye and monoazo-based dye. Some of these dyes may be mixed and used.

Furthermore, in the first resin, an inorganic or organic filler and a functionality-imparting agent such as heat-resisting agent, weatherproofing agent, crystal nucleus agent, crystallization accelerator, releasing agent, lubricant, antistatic agent, flame retardant and flame retardant aid, may be added.

The second resin member (accordingly, the material constituting the second resin member; hereinafter, the term simply referred to as a "second resin member" should be understood to include a "material constituting the second resin member") comprises a resin having no or little adhesive property to the first resin member.

The second resin member comprises only a second resin or comprises a second resin and an additive absorptive of laser light dispersed in the second resin.

As for the second resin constituting the second resin member, any kind of resin may be used as long as it is a resin having no or little adhesive property to the first resin member. Examples thereof include a resin such as polyamide, polypropylene and styrene-acrylonitrile copolymer, and a resin obtained by reinforcing the above-described resin with a glass fiber or a carbon fiber.

Other than these components, for example, an inorganic or organic filler and a functionality-imparting agent such as heat-resisting agent, weatherproofing agent, crystal nucleus agent, crystallization accelerator, releasing agent, lubricant, antistatic agent, flame retardant and flame retardant aid, may be added.

As for the additive having absorptivity of laser light in the second resin member, an inorganic colorant such as carbon black and composite oxide-based pigment, or an organic colorant such as phthalocyanine-based pigment and polymethine-based pigment, may be used.

In the case of comprising a second resin and an additive absorptive of laser light, the second resin member preferably has a transmittance of 5% or less for the laser light irradiated. If the transmittance exceeds 5%, the irradiated laser light is transmitted, as a result, not only the energy of laser light absorbed by the second resin member is reduced but also there arises a loss of the energy of the laser light.

The third resin member (accordingly, the material constituting the third resin member; hereinafter, the term simply referred to as a "third resin member" should be understood to include a "material constituting the third resin member") comprises, in the case where the second resin member is non-absorptive of laser light, a third resin and an additive absorptive of laser light dispersed in the third resin and, in the case where the second resin member is absorptive of laser light, comprises only a third resin or comprises a third resin and an additive absorptive of laser light dispersed in the third resin.

The third resin forming the third resin member comprises a polymer having at least one constitutional unit the same as or analogous to the constitutional unit of the first resin and at least one constitutional unit the same as or analogous to the constitutional unit of the second resin. This polymer may be reinforced with a glass fiber or a carbon fiber. Also, other resins may be blended within the range of not impairing the object of the present invention.

The term "structural unit the same as or analogous to the constitutional unit of the first or second resin" as used herein is a monomer unit having a chemical structure the same as or analogous to that of the monomer unit constituting the first or second resin, and this means that the third resin has compatibility with the first or second resin. More specifically, the laser welding is performed in such a state that the third resin member having compatibility (laser bondability) with both the first resin member and the second resin member is intervening between the first and second resin members having no laser bondability (the first resin member and the second resin member have no compatibility with each other), whereby the first resin member and the second resin member having no laser bondability to each other can be laser-bonded.

Incidentally, the term "having compatibility with the first or second resin" means that the difference in the solubility parameter between the third resin and the first or second resin is small, specifically, 1.4 or less, preferably 1.2 or less, more preferably 1.0 or less, and the molecular chains of both resins can be intermingled with each other.

The solubility parameter (Sp) value can be calculated from the polymer skeleton by the Fedors method (see, for example, R. F. Fedors, *Poly. Eng. and Sci.*, 14(2), 147 (1974)).

Specifically, when the first resin and the second resin are polyamide 6 (Sp value: 11.6) and polyamide 12 (Sp value; 9.9), examples of the third resin include nylon 612 (Sp value: 10.7), nylon 610 (Sp value: 10.8), nylon 611 (Sp value: 10.9), nylon 6/12 copolymer nylon, and nylon 6/66/12 ternary copolymer nylon. Also, in the case where the third resin is a copolymer nylon, the Sp value varies depending on the ratio of each component and, for example, in the polyamide 6/12 copolymer nylon, the weight ratio of the polyamide 6 component and the polyamide 12 component is preferably from 20/80 to 80/20.

The shape of the third resin member may be film, powder or paste but in view of easy handleability, film is preferred.

The thickness of the third resin member is from 1 to 1,000 μm, preferably from 5 to 500 μm. If the thickness of the third resin member exceeds 1,000 μm, it becomes very difficult to heat-melt the entire third resin member, and even if the entire third resin member can be heat-melted, this is energetically inefficient in view of irradiation time of laser light or the like. On the other hand, if the thickness of the third resin member is less than 1 μm, the third resin member may disadvantageously fail in bringing out its original operational effect of joining the first and second resin members having low compatibility with each other through the third resin member.

In the third resin, an inorganic or organic filler and a functionality-imparting agent such as heat-resisting agent, weatherproofing agent, crystal nucleus agent, crystallization accelerator, releasing agent, lubricant, antistatic agent, flame retardant and flame retardant aid, may be added.

As for the additive having absorptivity of laser light in the third resin member, an inorganic colorant such as carbon black, a composite oxide-based pigment, or an organic colorant such as phthalocyanine-based pigment and polymethine-based pigment, may be used.

In the case of a third resin and an additive absorptive of laser light, the third resin member preferably has a transmittance of 5% or less for the laser light irradiated. If the transmittance exceeds 5%, the irradiated laser light is transmitted and, as a result, not only the energy of laser light absorbed by the second resin member is reduced but also there arises a loss of the energy of laser light.

In the laser welding method of the present invention, referring to FIG. 1, a third resin member 3 is overlapped with a first resin member 1 and a second resin member 2, and laser light 4 is irradiated on the overlapped area from the first resin member side, whereby the three members are laser-welded.

Furthermore, when the first resin member, the second resin member and the third resin member are colored with a colorant of the same color, resins having the same color can be joined with each other and the joined resin member can have a good appearance.

Examples of the laser light used for laser welding include laser rays of a glass:neodymium$^{3+}$ laser, a YAG:neodymium$^{3+}$ laser, a ruby laser, a helium-neon laser, a krypton laser, an argon laser, an $H_2$ laser, an $N_2$ laser and a semiconductor laser. Among these lasers, a semiconductor laser is preferred.

The wavelength of laser light varies depending on the resin materials to be joined and cannot be indiscriminately determined but is preferably 400 nm or more. If the wavelength is less than 400 nm, serious deterioration of the resin occurs.

The irradiation dose of laser light is represented by the following formula and can be adjusted by the scanning rate and the output of the laser light. If the irradiation dose of laser light is low, joining faces of resin materials can be hardly melted with each other, whereas if the irradiation dose is high, this causes a problem that the resin material is evaporated or deteriorated to decrease the strength.

Laser irradiation dose (J/mm)=laser output (W)/scanning rate (mm/sec)

EXAMPLES

The present invention is described below by referring to Examples.

[Resins Used]
Polyamide 6 (1013NW8, produced by Ube Industries, Ltd.)
Polyamide 12 (3020B, produced by Ube Industries, Ltd.)
Polyamide 6/12 copolymer (7028B, produced by Ube Industries, Ltd.; 6/12=60/40 (by weight))
Polyamide 6/12 copolymer (7128B, produced by Ube Industries, Ltd.; 6/12=40/60 (by weight))

Example 1

A first resin member was produced by injection molding polyamide 6 (1013NW8, produced by Ube Industries, Ltd.) into an ASTM No. 1 dumbbell shape.

A second resin member was produced by injection molding polyamide 12 (3020B, produced by Ube Industries, Ltd.) into an ASTM No. 1 dumbbell shape.

A third resin member was produced by blending 0.3 wt % of carbon black with a polyamide 6/12 copolymer (7028B, produced by Ube Industries, Ltd.), and press-molding the resulting resin composition into a 400 μm-thick film shape.

The third resin member was overlapped with end parts of the first resin member and the second resin member and in this state, the resin members were set in a semiconductor laser apparatus. Subsequently, laser light was irradiated from the first resin member side to weld together those two members.

At this time, the laser light used for laser welding had a wavelength of 940 nm and was irradiated at the irradiation dose shown in Table 1. The tensile strength of the resulting welded member was measured according to ASTM D638 and the result is shown in Table 1.

Example 2

A first resin member was produced by injection molding polyamide 6 (1013NW8, produced by Ube Industries, Ltd.) into an ASTM No. 1 dumbbell shape.

A second resin member was produced by blending 0.3 wt % of carbon black with polyamide 12 (3020B, produced by Ube Industries, Ltd.), and injection molding the resulting resin composition into an ASTM No. 1 dumbbell shape.

A third resin member was produced by press-molding a polyamide 6/12 copolymer (7028B, produced by Ube Industries, Ltd.) into a 50 μm-thick film shape.

Thereafter, a laser welding test was performed in the same manner as in Example 1.

Example 3

A first resin member was produced by injection molding polyamide 6 (1013NW8, produced by Ube Industries, Ltd.) into an ASTM No. 1 dumbbell shape.

A second resin member was produced by blending 0.3 wt % of carbon black with polyamide 12 (3020B, produced by Ube Industries, Ltd.), and injection molding the resulting resin composition into an ASTM No. 1 dumbbell shape.

A third resin member was produced by press-molding a polyamide 6/12 copolymer (7128B, produced by Ube Industries, Ltd.) into a 50 μm-thick film shape.

Thereafter, a laser welding test was performed in the same manner as in Example 1.

Example 4

A first resin member was produced by injection molding polyamide 12 (3020B, produced by Ube Industries, Ltd.) into an ASTM No. 1 dumbbell shape.

A second resin member was produced by injection molding polyamide 6 (1013NW8, produced by Ube Industries, Ltd.) into an ASTM No. 1 dumbbell shape.

A third resin member was produced by blending 0.3 wt % of carbon black with a polyamide 6/12 copolymer (7028B, produced by Ube Industries, Ltd.), and press-molding the resulting resin composition into a 400 μm-thick film shape.

Thereafter, a laser welding test was performed in the same manner as in Example 1.

Example 5

A first resin member was produced by injection molding polyamide 12 (3020B, produced by Ube Industries, Ltd.) into an ASTM No. 1 dumbbell shape.

A second resin member was produced by blending 0.3 wt % of carbon black with polyamide 6 (1013NW8, produced by Ube Industries, Ltd.), and injection molding the resulting resin composition into an ASTM No. 1 dumbbell shape.

A third resin member was produced by press-molding a polyamide 6/12 copolymer (7128B, produced by Ube Industries, Ltd.) into a 50 μm-thick film shape.

Thereafter, a laser welding test was performed in the same manner as in Example 1.

Comparative Example 1

A first resin member was produced by injection molding polyamide 6 (1013NW8, produced by Ube Industries, Ltd.) into an ASTM No. 1 dumbbell shape.

A second resin member was produced by blending 0.3 wt % of carbon black with polyamide 12 (3020B, produced by Ube Industries, Ltd.), and injection molding the resulting resin composition into an ASTM No. 1 dumbbell shape.

Subsequently, the first resin member and the second resin member were overlapped at respective end parts and in this state, set in a semiconductor laser apparatus, and these two members were welded by irradiating laser light from the first resin member side.

Thereafter, a laser welding test was performed in the same manner as in Example 1.

Comparative Example 2

A first resin member was produced by injection molding polyamide 6 (1013NW8, produced by Ube Industries, Ltd.) into an ASTM No. 1 dumbbell shape.

A second resin member was produced by injection molding polyamide 12 (3020B, produced by Ube Industries, Ltd.) into an ASTM No. 1 dumbbell shape.

A third resin member was produced by kneading polyamide 6 (1013NW8, produced by Ube Industries, Ltd.) and polyamide 12 (3020B, produced by Ube Industries, Ltd.) with 0.3 wt % of carbon black in Brabender at 250° C. for 5 minutes, and press-molding the resulting polyamide 6/polyamide 12 alloy into a 400 μm-thick film shape.

Subsequently, the first resin member and the second resin member were overlapped at respective end parts and in this state, set in a semiconductor laser apparatus, and these two members were welded by irradiating laser light from the first resin member side.

Thereafter, a laser welding test was performed in the same manner as in Example 1.

TABLE 1

|  | Example | | | | | Comparative Example | |
| --- | --- | --- | --- | --- | --- | --- | --- |
|  | 1 | 2 | 3 | 4 | 5 | 1 | 2 |
| First resin member | 1013NW8 | 1013NW8 | 1013NW8 | 3020B | 3020B | 1013NW8 | 1013NW8 |
| Second resin member | 3020B | 3020B | 3020B | 1013NW8 | 1013NW8 | 3020B | 3020B |
| Absorptive additive | — | added | added | — | added | added | — |
| Third resin member | 7028B | 7028B | 7128B | 7028B | 7128B | — | 1013NW8/3020B |
| Thickness (μm) | 400 | 50 | 50 | 400 | 50 | — | 400 |
| Absorptive additive | added | — | — | added | — | — | added |
| Laser irradiation dose (J/mm) | 2.9 | 2.3 | 2.3 | 2.3 | 1.3 | 2.9 | 5.0 |
| Tensile strength (N) | 330 | 360 | 280 | 290 | 260 | 75 | 75 |

INDUSTRIAL APPLICABILITY

In the present invention, resin members which are dissimilar materials having no or little adhesive property and cannot be satisfactorily joined by laser welding, hot plate welding, vibration welding, ultrasonic welding, spin welding or injection welding such as DRI and DSI, are joined through the intervention of a material having compatibility with those two members, whereby, when the resins of three members are melted by the effect of laser light energy, the resin members are thoroughly intertwined with each other in the junction part and the joining strength is remarkably enhanced. Thus, the industrial usefulness is high.

The invention claimed is:

1. A set of laser weldable materials used for laser-welding a first resin member and a second resin member with a third resin member by arranging the third resin member in between the first resin member and the second resin member and irradiating laser light to the three resin members of the first, second and third resin members from a first resin member side, said set of laser weldable materials comprising three materials constituting the first, second and third resin members, respectively, the first resin member and the second resin member being of different materials, and the first resin member being non-absorptive of laser light, wherein the material constituting the first resin member comprises a first resin non-absorptive of laser light, the material constituting the second resin member comprises a second resin and an additive absorptive of laser light, and the material constituting the third resin comprises a polymer having at least one constitutional unit the same as or compatible with the constitutional unit of the first resin and at least one constitutional unit of the same as or compatible with the constitutional unit of the second resin.

2. A set of laser weldable materials used for laser-welding a first resin member and a second resin member with a third resin member by arranging the third resin member in between the first resin member and the second resin member and irradiating laser light to the three resin members of the first, second and third resin members from a first resin member side, said set of laser weldable materials comprising three materials constituting the first, second and third resin members, respectively, the first resin member and the second resin member being of different materials and the first resin member being non-absorptive of laser light, wherein the material constituting the first resin member comprises a first resin non-absorptive of laser light, the material constituting the second resin member comprises a second resin, and the material constituting the third resin comprises a third resin and an additive absorptive of laser light, and the third resin comprises a polymer having at least one constitutional unit the same as or compatible with the constitutional unit of the first resin and at least one constitutional unit the same as or compatible with the constitutional unit of the second resin.

3. The set of laser weldable materials as claimed in claim 1 or 2, wherein the first resin, the second resin and the third resin each is a polyamide.

4. The set of laser weldable materials as claimed in claim 1 or 2, wherein a combination of the first resin and the second resin is a combination of polyamide 6 and polyamide 12.

5. The set of laser weldable materials as claimed in claim 1 or 2, wherein the material constituting the first resin member further comprises an additive weakly absorptive of laser light.

6. The set of laser weldable materials as claimed in claim 1 or 2, wherein the third resin is a polyamide 6/12 copolymer nylon.

7. The set of laser weldable materials as claimed in claim 6, wherein the weight ratio of the polyamide 6 component and the polyamide 12 component in the polyamide 6/12 copolymer nylon is from 20/80 to 80/20.

8. The set of laser weldable materials as claimed in claim 1 or 2, wherein the material constituting the third resin member is a film.

9. The set of laser weldable materials as claimed in claim 8, wherein the film has a thickness from about 1 to about 1,000 μm.

10. A laser welding method comprising:
arranging a third resin member in between a first resin member and a second resin member, the first resin member and the second resin member being of different materials, the first resin member being non-absorptive of laser light, the second resin member being absorptive of laser light, the second resin member comprising a second resin and an additive absorptive of laser light; and
irradiating laser light to the three members of the first, second and third resin members from a first resin member side to laser-weld the three members,
wherein said third resin comprises a polymer having at least one constitutional unit the same as or compatible with the constitutional unit of the first resin and at least one constitutional unit the same as or compatible to the constitutional unit of the second resin.

11. A laser welding method comprising:
arranging a third resin member in between a first resin member and a second resin member, the first resin member and the second resin member being of different materials, the first resin member being non-absorptive of laser light, the third resin member comprising a third resin and an additive absorptive of laser light; and
irradiating laser light to the three members of the first, second and third resin members from a first resin member side to laser-weld the three members,
wherein the third resin comprises a polymer having at least one constitutional unit the same as or compatible with the constitutional unit of the first resin and at least one constitutional unit the same as or compatible with the constitutional unit of the second resin.

12. The laser welding method as claimed in claim 10 or 11, wherein the first resin, the second resin and the third resin each is a polyamide.

13. The laser welding method as claimed in claim 10 or 11, wherein a combination of the first resin and the second resin is a combination of polyamide 6 and polyamide 12.

14. The laser welding method as claimed in claim 10 or 11, wherein the first resin member further comprises an additive weakly absorptive of laser light.

15. The laser welding method as claimed in claim 10 or 11, wherein the third resin is a polyamide 6/12 copolymer nylon.

16. The laser welding method as claimed in claim 15, wherein the weight ratio of the polyamide 6 component and the polyamide 12 component in the polyamide 6/12 copolymer nylon is from 20/80 to 80/20.

17. The laser welding method as claimed in claim 10 or 11, wherein the third resin member is a film.

18. The laser welding method as claimed in claim 17, wherein the film has a thickness from about 1 to about 1,000 μm.

* * * * *